Dec. 31, 1968     O. M. B. ISSENMANN     3,418,841
MEASUREMENT OF THE VOLUME OF GASES CONTAINED IN A PREDETERMINED
QUANTITY OF ANY MATERIAL AND ESPECIALLY GEOLOGICAL SAMPLES SUCH
AS DRILLING MUDS, WATERS AND ROCKS
Filed June 1, 1965
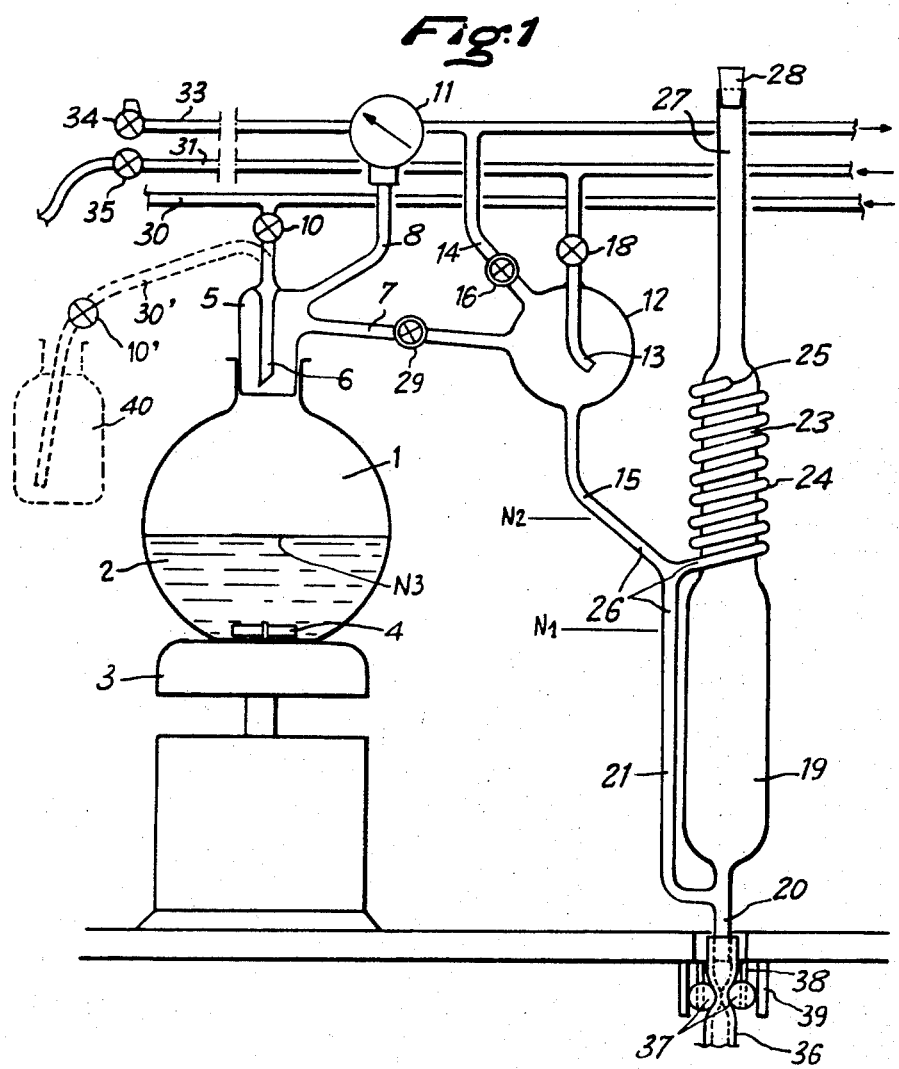
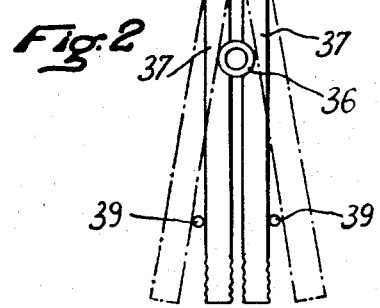
Inventor
Olivier Marie Bernard Issenmann
by Michael J. Striker

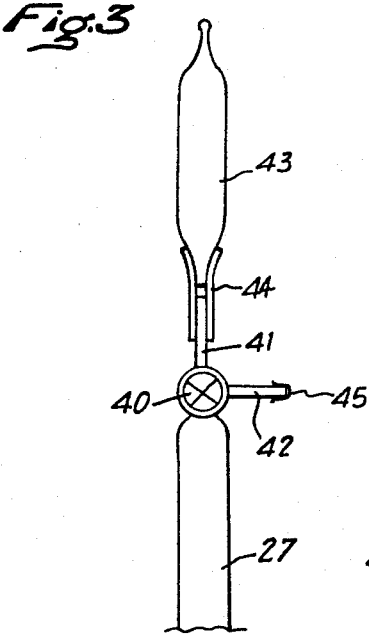
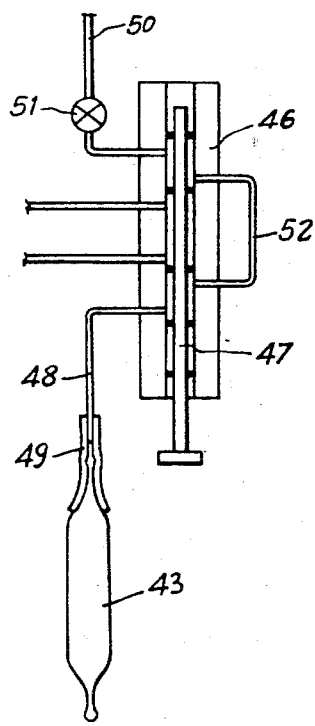
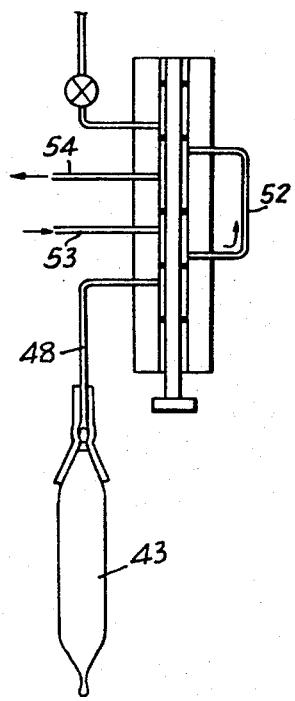

United States Patent Office 3,418,841
Patented Dec. 31, 1968

3,418,841
MEASUREMENT OF THE VOLUME OF GASES CONTAINED IN A PREDETERMINED QUANTITY OF ANY MATERIAL AND ESPECIALLY GEOLOGICAL SAMPLES SUCH AS DRILLING MUDS, WATERS AND ROCKS
Olivier Marie Bernard Issenmann, Boulogne-sur-Seine, France, assignor to Geoservices, an anonymous society
Filed June 1, 1965, Ser. No. 460,239
Claims priority, application France, June 3, 1964, 976,904; May 25, 1965, 18,283
9 Claims. (Cl. 73—19)

ABSTRACT OF THE DISCLOSURE

A method and apparatus for measuring and recovering gases contained in a predetermined quantity of material such as drilling mud, crushed rock and the like, in which the material is heated in a vacuum and the gases emanating during the heating are driven into an evacuated measuring chamber by steam developing during continued heating of the material, in which subsequently thereto any steam in the measuring chamber is condensed while the gas therein is prevented from leaving the measuring chamber, whereafter the gas in the measuring chamber is subjected to atmospheric pressure while mixing of the gas with air is prevented and the amount of gas developed from the predetermined quantity of material is measured at atmospheric pressure. Finally, the gas is discharged from the measuring chamber for qualitative analysis.

---

The object of this invention is to determine the nature and to measure the volume of either gases or vapor contained in a predetermined quantity of any material and especially liquid geological samples such as drilling mud, underground or surface water, but also solid geological samples such as subterranean rocks or surface rocks, in such a manner as to permit of quantitative and/or qualitative analysis of said gases.

The present invention makes it possible in particular, in a geochemical study, to test for traces of gaseous hydrocarbons in rocks and water.

In accordance with the present invention, this result is achieved by heating in vacuum and bringing to the boil a predetermined quantity of material contained in a vessel, by causing the gases thus evolved to pass into a measuring chamber through a non-return valve (for example a water trap), by maintaining the said material at boiling point for a suitable period of time after the gases have been exhausted from the material so that the steam thus produced is caused to drive into the measuring chamber any gases which may have remained within said vessel and within the communication means which connect this latter to said chamber, and by measuring the volume of gases collected within said measuring chamber.

This invention is also directed to other arrangements which will be described hereinafter, reference being made to the accompanying drawings, wherein:

FIG. 1 is a diagrammatic sectional view of one apparatus which forms part of a bank of similar units designed to measure the volume of gases contained within a predetermined quantity of drilling mud.

FIG. 2 is a plan view of a detail of said apparatus.

FIG. 3 is an alternative form of a portion of the apparatus which is illustrated in FIG. 1.

FIGS. 4 and 5 show two different positions of a device for injecting collected gases into a chromatographic column.

FIG. 1 illustrates one of the units which will be referred-to hereinafter as desorbers which forms part of a bank of desorbers. Said desorbers are connected in turn to three feed-pipes 30, 31 and 33.

The feed-pipe 30 serves to supply the balloon flasks 1 of the different desorbers with liquid to be processed, namely with drilling mud in the case under consideration.

The feed-pipe 31 serves to supply the reservoirs 12 of the different desorbers with retaining liquid, namely saturated salt water in the case under consideration. That end of said feed-pipe 31 which is opposite to the end at which liquid is admitted is open to free air and can be closed by a cock 35 which is normally closed but which is open for draining-off retaining liquid from the feed-pipe 31 at the moment of putting the bank of desorbers into service.

The feed-pipe 33 serves to put the reservoirs 12 of the different desorbers into communication with a vacuum source, not shown in the drawings. That end of said feed-pipe 33 which is oppoiste to the end connected to the vacuum source can be closed by a valve 34. Said valve can advantageously consist of an electrically operated solenoid valve which is closed when the solenoid is under tension, with the result that the electrically operated valve 34 closes as soon as the vacuum source is put into operation and opens when the vacuum source is cut off, thereby connecting the feed-pipe 33 to atmospheric pressure.

The desorber which is illustrated in FIG. 1 comprises:

(a) A glass balloon flask 1 in which is placed a known quantity of drilling mud 2 which is heated and stirred by a magnetic heating agitator 3, the Teflon-covered magnetic bar 4 of which is placed in the mud.

(b) A glass head-piece 5 which is connected to the balloon flask 1 by means of a conical ground-glass joint and comprising an admission tube 6 of which the lower extremity is cut diagonally, and two external exhaust tubes 7 and 8. The upper extremity of the tube 6 is connected to the feed-pipe 30. A cock 10 controls the admission of mud within the balloon flask 1. The tube 7 slopes downwardly to a small extent towards the right hand side of the figure and can be closed by means of a cock 29. A vacuum gauge 11 which is graudated from 0 to 760 mm. of mercury is placed at the end of the tube 8.

(c) A spherical reservoir 12 which is connected to the tube 7 and comprises an internal admission tube 13 having a curved end and two other external tubes 14 and 15. The tube 14 is connected to the feed-pipe 33 and can be closed by a vacuum cock 16. The tube 13 is connected to the feed-pipe 31 containing saturated salt water under the control of a cock 18.

(d) A glass measuring unit which in turn comprises:

(1) at the bottom portions thereof, a cylindrical reservoir 19 with a bottom discharge tube 20. There is fitted over the end of said tube 20 a rubber pipe 36 which can be closed by flattening between two cylindrical rods 37, the said rods being pivotally mounted about two knuckle-joint axes 38 and clamped at the front ends between two studs 39. When it is desired to open the pipe 36, the rods 37 are swung downwardly below rods 37 are swung downwardly below the studs 39. A tube 21 is joined to the tube 20.

(2) in the central portion thereof, a cylinder 23 which forms a continuation of the cylinder 19 but is of smaller diameter and about which is wound a glass coil 24. The lower extremity of said glass coil is joined at 25 to the tubes 15 and 21 so as to form with these latter a Y junction 26.

(3) at the top portion thereof, a graduated tube 27 which forms an extension of the cylinder 23 but is of smaller diameter and upper extremity of which is closed by a plastic stopper 28.

In order to prepare a desorber, the mode of operation can be as follows: the stopper 28 is removed and the cock 18 opened until the level of saturated salt water reaches the level $N_1$ slightly below the fork 26 both within the reservoir 19 and within the tube 21. The cock 18 is then closed and the stopper 28 is replaced.

All of the cocks are then closed. The cocks 29 and 16 are opened and the vacuum source is put into operation. The cock is closed again when the vacuum within the desorber and in particular within the measuring chamber 27 has reached the desired value as can be read from the vacuum gauge 11.

The cock 18 is opened again and retaining liquid again penetrates into the apparatus. The cock 18 is closed when the retaining liquid reaches the level $N_2$ within the tube 15, the tube 23 and the coil 24. Since this level $N_2$ is located above the fork 26, the upper portion of the coil 24 and of the cylinder 23 as well as the tube 27 are isolated from the remainder of the apparatus by a liquid trap.

The apparatus is ready for taking a measurement of the volume of gases.

In order to carry this operation into practice, the cock 10 is opened until the desired quantity of mud admitted through the tube 6 into the balloon flask 1 reaches the level $N_3$. The cock 10 is closed and the heating agitator 3 is started up.

After a certain time, the mud begins to boil in vacuum. The air and gases contained in the mud are entrained by the steam, exhausted through the tube 7, drive the liquid within the tube 15 from the level $N_2$ down to the work 26, then flow into the coil 24 and entrain the water contained therein up to the junction zone 25, at which the coil opens into the tube, and are trapped within the tube 27. The entrained steam condenses and the water thus produced collects in the reservoir 19.

The bubbling of air and gases in contact with the salt water within the coil 24 produces the cooling and condensation of the steam contained therein. Since the salt water is saturated, a negligible quantity of air and of gas passes into solution in said water.

When all of the gases have been given off by the mud, the heating is cut off and the agitator 4 is stopped, the cock 29 is closed and the cock 18 is opened until all of that part of the apparatus which is located on the right hand side of the cock 29 is filled with salt water and all of the gases are delivered into the tube 27. The vacuum source being cut off, the cock 16 is opened so as to re-establish within the desorber the atmospheric pressure which then prevails within the feed-pipe 33. The volume of the gases contained within the graduated tube 27 at atmospheric pressure is then measured. The gases which have collected within the tube 27 are recovered by means of a device such as a syringe, the needle of which passes through the stopper 28 and the salt water is discharged by opening the pipe 36 after having withdrawn the stopper 28.

The gas which is thus recovered it then analyzed, preferably by gas chromatography, with a view to determining the nature and concentration of the different gases detected within the material thus processed.

In the case in which the material to be analyzed is a rock sample, one of the three methods outlined below can be employed:

(a) A first method consist, after introducing the rock sample to be processed within the balloon flask 1 and creating a vacuum in the apparatus, in simply introducing through the cock 10 a quantity of distilled water which is from three to five times greater than the weight of the rock sample, then in heating the balloon flask 1 in the same manner as the liquid sample described heretofore; the boiling water produces a certain desorption of the gases which are occluded within the rock sample and which are carried by the steam into the condenser of the apparatus in which said gases are trapped within the tube 27.

(b) A second method consists in placing within the balloon flask 1 a known quantity of rock which has previously been crushed, in creating a vacuum within the desorber, and in dissolving the rock material either totally or partially by means of a chemical agent which may be liquid or in solution in a liquid and introduced through the feed-pipe 30 and the cock 10. The reaction must be such that it permits the liberation of the gases contained in the rock material and, on the other hand, the reaction must initiate the evolution of a carrier gas so as to entrain the gases to be collected up to the tube 27, and it must be possible for said carrier gas to be either condensed or absorbed by the retaining liquid of the reservoir 19.

Accordingly, in the case of carbonaceous rocks, it is possible to employ an acid which attacks them and causes the evolution of carbon dioxide gas which will be absorbed by employing as retaining liquid a 30% solution of potassium hydroxide.

(c) A third method consists, after creating a vacuum within the apparatus over the rock sample, in introducing through the cock 10 a quantity of distilled water which is just sufficient to soak the rock sample to be analyzed or alternatively in not introducing anything into the balloon flask 1 if said sample is already naturally impregnated with water (case of samples taken from moist ground), and in heating the balloon flask 1 gently until the water of the sample has completely evaporated; the steam then carries the occluded gases of the rock sample towards the measuring tube 27. In this case, the heating agitator 3 is advantageously replaced by a jacket-type flask-heater with a temperature-regulating device which permits of more uniform heating without any danger of reaching too high temperatures which would be liable to result in alteration of the rock sample and of the organic substances which it can contain. This method is of particular advantage when processing rocks such as sandstones and argillaceous rocks.

In the last-mentioned case of desorption by complete evaporation of the water contained in the rock and desiccation, it may prove useful to cool the coil 24. The end of the operation is indicated by the fact that the level of retaining liquid rises within the tube 15.

It is possible to store either all or a part of the gases collected within the tube 27, for example if it is found desirable to postpone the anlaysis of these gases for a certain time either because an analyzing apparatus cannot be placed beside the desorber or because it is desired to perform the analysis in a number of stages.

In this case, the top of the tube 27 is modified in the manner which is shown in FIG. 3; the stopper 28 is replaced by a three-way cock 40 fitted with two capillary tubes 41 and 42; the cock 40 can take up three positions:

Position 1: communication between the tube 27 and the capillary tube 41. The capillary tube 42 is in that case isolated.

Position 2: isolation of the three tubes 27, 41 and 42 relatively to each other.

Position 3: communication between the tube 27 and the tube 42, the tube 41 being isolated from the others.

A glass ampoule 43, for example of the type employed in pharmacy, is closed at its upper extremity. The open lower extremity is in communication with the tube 41 and connected to this latter by means of a simple rubber tube 44 of suitable diameter.

The operation is as follows:

When a vacuum is produced within the desorber in the initial stage of preparation of this latter (see above) the cock 40 is placed in position 1 (a vacuum is also produced within the ampoule). The cock 4 is then moved to position 2.

When atmospheric pressure has been restored on completion of the desorption process, the volume of gas collected is read directly from the graduation marks on the tube 27, the zero of which is on the cock 40.

By setting the cock 40 in position 3, a part of the gas which has been collected can be extracted by means of the syringe, the needle of which is inserted through the rubber cap 45 for the purpose of performing a first analysis.

By replacing the cock in position 1, a part of the gas flows into the ampoule 43, still in a vacuum. The ampoule is removed and the open end thereof is rapidly sealed by means of a suitable burner. Experience has shown that this method of storage does not modify the gas thus collected in any respect, even if said gas is combustible and mixed with air.

This device which is illustrated in FIG. 3 can be simplified by dispensing with the cock 40 and the tube 42 and by leaving only the tube 41 which is directly coupled to the tube 27 and fitted with the ampoule 43. In this case, the measurement of the volume of gas must take into account the volume of the ampoule.

FIGS. 4 and 5 show by way of example only a device for the delayed injection of gas stored within the ampoule 43 into a chromatographic column for the purpose of analysis. The injection valve 46 is of conventional type comprising a push rod fitted with sealing rings 47 and designed to slide within the cylinder 46. The sealed ampoule 43 is connected to the injection tube 48 by means of a flexible tube 49, after care has been taken to make a saw-cut on that extremity of said ampoule which is inserted within the tube 49. A vacuum is then created in the tube 50 by opening the cock 51, and the said cock is then closed again. The tip of the ampoule 43 is then broken off simply by bending the flexible tube 49; the gaseous contents of the ampoule 43 are discharged into the sampling tube 52. By pushing the valve rod (as shown in FIG. 5), the gas which is trapped at 52 is entrained by the carrier gas which is admitted at 53 and is discharged at 54 towards the chromatographic column and the detector.

In the foregoing, the retaining liquid employed must satisfy the following conditions:

(a) It is intended to allow gases to pass towards the tube 27 and to prevent gases from returning in the opposite direction.

(b) It is intended to absorb the carrier gas employed (carbon dioxide gas, water vapor, etc. . . . ).

(c) It is capable of absorbing certain gases originally contained in the rock sample or evolved in the reaction, when it is not desired to measure said gases or when these latter are a cause of inconvenience in subsequent analyses. For example, oxygen could be absorbed by a conventional solution such as potassium pyrogallate, or ethylene and acetylene hydrocarbons could be absorbed by bromine water when only saturated hydrocarbons are being sought.

It is also possible:

(a) To replace the feed-pipes 30 and 33 by reservoirs which contain respectively the liquid to be processed and the retaining liquid, these liquids being introduced in the balloon flask 1 or the reservoir 12 under the control of the cocks 10 and 18.

(b) To replace the feed-pipe 30 by a flask 40 and a pipe 30' as shown in broken lines in FIG. 1 when it is required to analyze a liquid which is only available in a small quantity. In this case, the cock 10' is opened after having created a vacuum within the desorber so as to cause the liquid to flow from the flask 40 into the balloon-flask 1. The cock 10' must evidently be closed when the balloon-flask contains the desired quantity of this liquid and the operation is then carried out as explained heretofore.

What I claim is:

1. An apparatus for measuring and recovering gases contained in a predetermined quantity of material such as drilling mud, crushed rock and the like, comprising, in combination, a vessel for receiving the material; heating means cooperating with the vessel for heating the latter and the material therein for driving gas contained in the material out of the latter; a measuring chamber; passage means providing communication between said vessel and said measuring chamber so that gas developed in said vessel may flow into said measuring chamber; non-return valve means in form of a liquid trap cooperating with said passage means for preventing return flow of gas from said measuring chamber into said vessel; means for condensing any steam which may have penetrated together with said gas into said measuring chamber; a source of vacuum; and means for selectively connecting said vessel and said measuring chamber with said source of vacuum and the atmosphere.

2. An apparatus as defined in claim 1, wherein said measuring chamber is formed by one arm of an upright U-shaped tube and wherein said passage means communicates with the other arm of said U-shaped tube.

3. An apparatus as defined in claim 2, and including openable and closeable discharge means connected to the bottom of said upright U-shaped tube.

4. An apparatus as defined in claim 2, and including by-pass means connecting intermediate points of said U-shaped tube to each other.

5. An apparatus as defined in claim 4, wherein said by-pass means extends in a coil about part of said one arm of said U-shaped tube.

6. An apparatus as defined in claim 2, and including a reservoir, and means for feeding saturated salt water into said reservoir, said reservoir being connected to said passage means in such a manner that salt water fed into said reservoir will flow into said U-shaped tube to drive gases contained in said passage means and said other arm of said U-shaped tube into said one arm.

7. An apparatus as defined in claim 1, and including gas discharge means communicating with the top portion of said measuring chamber, and means for opening and closing said discharge means.

8. An apparatus as defined in claim 7, wherein said means for opening and closing said gas discharge means comprise a three-way valve having three passageways, one of which communicates with said measuring chamber, the second passage means being connected to an ampoule, and the third of which is closed by a cap of pierceable material so that at least part of the gas discharged by said gas discharge means may be taken for immediate analysis by piercing the cap with a needle of a syringe.

9. A method for measuring and recovering gases contained in a predetermined quantity of material such as drilling mud, crushed rock and the like, said method comprising the steps of heating said predetermined quantity of material in vacuum; feeding the gases emanating from the material during heating thereof into an evacuated measuring chamber; continuing the heating of the material to produce steam therefrom and driving by means of the steam all gases emanating from the material into the measuring chamber; condensing any steam which may have penetrated into the measuring chamber while preventing gas therein from flowing out; subjecting the gas in the measuring chamber to atmospheric pressure while preventing mixing of the gas therein with air so that the amount of gas developed from said predetermined quantity of material may be measured in the measuring chamber under atmospheric pressure; and discharging the gas from the measuring chamber for qualitative analysis.

References Cited

UNITED STATES PATENTS

| | | | |
|---|---|---|---|
| 2,361,844 | 10/1944 | Horner | 73—19 |
| 3,240,068 | 3/1966 | Horeth et al. | 73—19 |

RICHARD C. QUEISSER, *Primary Examiner.*

C. IRVIN McCLELLAND, *Assistant Examiner.*